United States Patent
Asahara et al.

(10) Patent No.: US 11,181,127 B2
(45) Date of Patent: Nov. 23, 2021

(54) CYLINDER DRIVE MANIFOLD DEVICE AND CYLINDER DRIVE APPARATUS

(71) Applicant: SMC CORPORATION, Chiyoda-ku (JP)

(72) Inventors: Hiroyuki Asahara, Tsukuba (JP); Kazutaka Someya, Kashiwa (JP)

(73) Assignee: SMC CORPORATION, Chiyoda-ku (JP)

( * ) Notice: Subject to any disclaimer, the term of this patent is extended or adjusted under 35 U.S.C. 154(b) by 77 days.

(21) Appl. No.: 16/614,194

(22) PCT Filed: Apr. 2, 2018

(86) PCT No.: PCT/JP2018/014058
§ 371 (c)(1),
(2) Date: Nov. 15, 2019

(87) PCT Pub. No.: WO2018/211837
PCT Pub. Date: Nov. 22, 2018

(65) Prior Publication Data
US 2020/0149560 A1 May 14, 2020

(30) Foreign Application Priority Data
May 17, 2017 (JP) .............................. JP2017-098128

(51) Int. Cl.
*F15B 11/16* (2006.01)
*F15B 13/08* (2006.01)
*F16K 27/02* (2006.01)

(52) U.S. Cl.
CPC .......... *F15B 11/16* (2013.01); *F15B 13/0814* (2013.01); *F16K 27/02* (2013.01)

(58) Field of Classification Search
CPC .... F15B 11/16; F15B 13/0814; F15B 13/021; F15B 2211/40584; F15B 2211/30505; F15B 2211/40515
See application file for complete search history.

(56) References Cited

U.S. PATENT DOCUMENTS 5,400,821 A 3/1995 Ott
6,167,901 B1 * 1/2001 Yoshinura ........... F15B 13/0402
137/269
(Continued)

FOREIGN PATENT DOCUMENTS

CN 1676949 A 10/2005
CN 103857924 A 6/2014
(Continued)

OTHER PUBLICATIONS

International Search Report dated Jul. 3, 2018 in PCT/JP2018/014058 filed on Apr. 2, 2018.
(Continued)

*Primary Examiner* — Michael R Reid
(74) *Attorney, Agent, or Firm* — Oblon, McClelland, Maier & Neustadt, L.L.P.

(57) ABSTRACT

The present invention allows the number of components to be reduced and assembly work to be easily performed. A cylinder drive manifold device that constitutes a cylinder drive apparatus is provided with a block-shaped manifold in which a plurality of holes are formed for circulating a fluid used for driving a plurality of fluid pressure cylinders. The manifold is configured such that a plurality of switching valves for supplying a fluid alternately to a first cylinder chamber and a second cylinder chamber of each of the fluid pressure cylinders are attachable. A plurality of check valves and a plurality of throttle valves are incorporated into the plurality of holes of the manifold.

6 Claims, 10 Drawing Sheets

(56) References Cited

U.S. PATENT DOCUMENTS

| | | | |
|---|---|---|---|
| 7,454,903 | B2 | 11/2008 | Matsumoto et al. |
| 9,372,485 | B2 | 6/2016 | Matsumura |
| 2003/0127144 | A1 | 7/2003 | Seyfarth |
| 2009/0094971 | A1* | 4/2009 | Dantas ............. B66F 7/20 60/327 |
| 2014/0305115 | A1 | 10/2014 | Matsuda et al. |

FOREIGN PATENT DOCUMENTS

| | | |
|---|---|---|
| CN | 103917787 A | 7/2014 |
| JP | 2-118202 A | 5/1990 |
| JP | 6-213342 A | 8/1994 |
| JP | 2011-311404 A | 11/2001 |
| KR | 2003-0075002 A | 9/2003 |

OTHER PUBLICATIONS

Office Action dated Sep. 18, 2020 in corresponding Indian Patent Application No. 20197051714 (with English Translation), citing documents AO-AQ therein, 10 pages.

Combined Chinese Office Action and Search Report dated Sep. 21, 2020 in corresponding Chinese Patent Application No. 201880032631.8 (with English Translation and English Translation of Category of Cited Documents) citing documents AO, AR and AS therein, 14 pages.

Combined Office Action and Search Report dated Dec. 22, 2020 in Chinse Patent Application No. 201880032631.8 , with English translation and English translation of cited documents, citing documents AO therein, 7 pages.

Extended European Search Report dated Jan. 22, 2021 in Patent Application No. 18802075.4, citing document AA therein, 6 pages.

\* cited by examiner

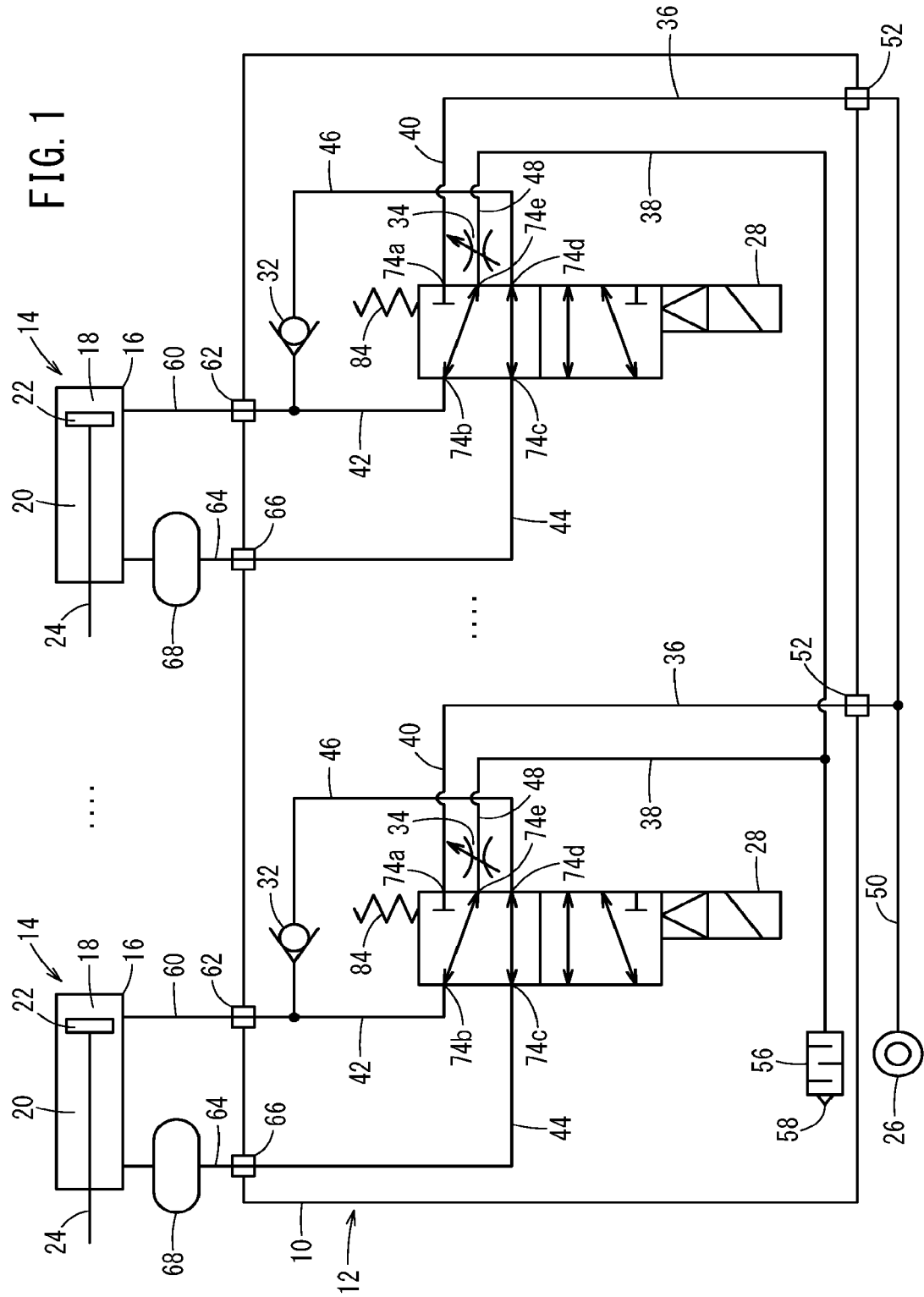

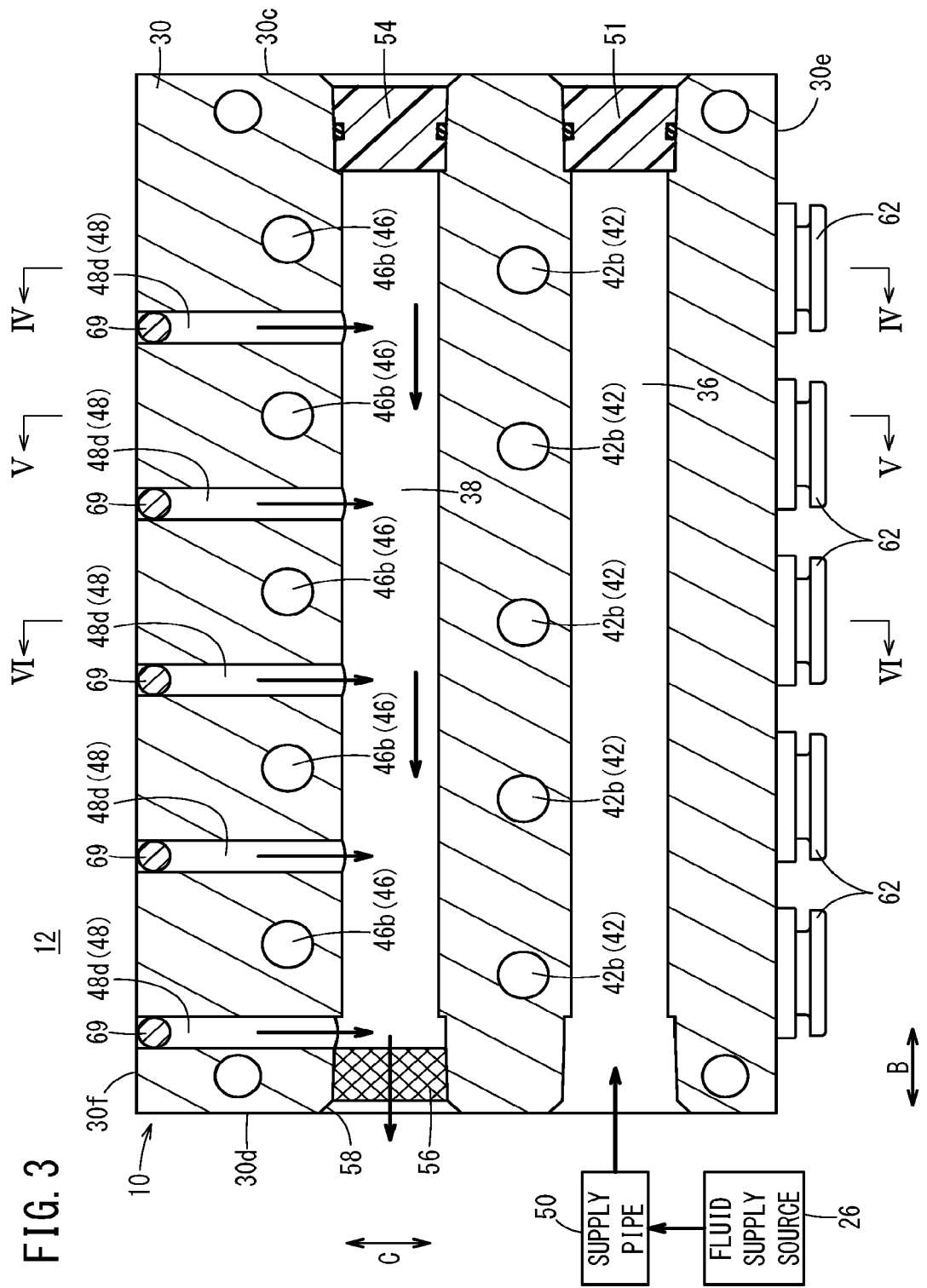

CYLINDER DRIVE MANIFOLD DEVICE AND CYLINDER DRIVE APPARATUS

TECHNICAL FIELD

The present invention relates to a cylinder drive manifold device and a cylinder drive apparatus configured to drive a plurality of fluid pressure cylinders.

BACKGROUND ART

Conventionally, a cylinder drive apparatus has been widely used, which drives a fluid pressure cylinder by supplying a fluid such as air or the like alternately to a first cylinder chamber and a second cylinder chamber that are partitioned by a piston of the fluid pressure cylinder (see, for example, Japanese Laid-Open Patent Publication No. 2001-311404).

SUMMARY OF INVENTION

Incidentally, in factories or the like, a plurality of such fluid pressure cylinders are used. A cylinder drive apparatus for driving the fluid pressure cylinders may be equipped respectively with a plurality of switching valves, check valves, and throttle valves. In general, valve members of this type are connected mutually to one another by pipes. However, in this case, since the number of pipes is large, there is a problem in that the number of parts increases, and the assembly operation (a pipe connecting operation, etc.) when incorporating the cylinder drive apparatus into a plurality of fluid pressure cylinders becomes complicated.

The present invention has been devised taking into consideration the aforementioned problem, and has the object of providing a cylinder drive manifold device and a cylinder drive apparatus in which, together with enabling a reduction in the number of parts, it is possible to easily perform an assembly operation.

In order to realize the aforementioned object, according to the present invention, provided is a cylinder drive manifold device configured to drive a plurality of fluid pressure cylinders, the cylinder drive manifold device comprising a block-shaped manifold in which a plurality of holes are formed through which a fluid used to drive the plurality of fluid pressure cylinders flows, wherein the manifold is configured to enable a plurality of switching valves to be mounted thereon, the switching valves being configured to alternately supply the fluid to a first cylinder chamber and a second cylinder chamber partitioned by a piston of each of the fluid pressure cylinders, and a plurality of check valves and a plurality of throttle valves are incorporated in the plurality of holes of the manifold.

In accordance with such a configuration, since the plurality of check valves are incorporated in the plurality of holes of the manifold, piping for the purpose of connecting the switching valves and the check valves to each other is rendered unnecessary. Further, since a plurality of throttle valves are incorporated in the plurality of holes of the manifold, piping for the purpose of connecting the switching valves and the throttle valves to each other is rendered unnecessary. Accordingly, it is possible to reduce the number of parts of the cylinder drive manifold device, together with making it easy to perform the assembly operation.

In the above-described cylinder drive manifold device, the plurality of holes of the manifold may include a plurality of introduction ports configured to introduce the fluid into the respective switching valves, a plurality of lead-out ports through which the fluid is guided from the respective switching valves, a plurality of first connection ports configured to enable mutual communication between the respective switching valves and the first cylinder chambers of the respective fluid pressure cylinders, a plurality of second connection ports configured to enable mutual communication between the respective switching valves and the second cylinder chambers of the respective fluid pressure cylinders, and a plurality of third connection ports configured to connect the first connection ports and the switching valves to each other, wherein, in each of the third connection ports, the check valve may be provided which allows flow of the fluid in a direction from the first connection port toward the switching valve, and which prevents flow of the fluid in a direction from the switching valve toward the first connection port, the throttle valve may be provided in the respective lead-out ports, each of the switching valves may be configured to switch between a state of communication and a state of blockage, respectively, between the introduction port and the first connection port, between the first connection port and the lead-out port, between the lead-out port and the second connection port, and between the second connection port and the third connection port. Further, in a first position of the switching valves, the introduction port and the first connection port may communicate with each other, and the lead-out port and the second connection port may communicate with each other, while communication between the first connection port and the lead-out port may be blocked, and communication between the second connection port and the third connection port may be blocked, and in a second position of the switching valves, the first connection port and the lead-out port may communicate with each other, and the second connection port and the third connection port may communicate with each other, while communication between the introduction port and the first connection port may be blocked, and communication between the lead-out port and the second connection port may be blocked.

In accordance with such a configuration, in the second position of the switching valves, the fluid in the first cylinder chamber of the fluid pressure cylinder is supplied to the second cylinder chamber and simultaneously discharged to the lead-out port via the first connection port, the third connection port, and the second connection port. Consequently, the fluid pressure in the second cylinder chamber increases and the fluid pressure in the first cylinder chamber rapidly decreases, and therefore, it is possible to reduce the amount of fluid that is consumed in order to drive the fluid pressure cylinder. Therefore, it is possible to achieve a saving of energy when the plurality of fluid pressure cylinders are driven.

In the above-described cylinder drive manifold device, in each of the first connection ports and each of the third connection ports, a fluid flow path may be formed so as to extend linearly to the check valve from an opening of the first connection port in which a connector, to which a pipe communicating with the first cylinder chamber is connectable, is configured to be mounted.

In accordance with such a configuration, in comparison with a case in which the fluid flow path from the opening of the first connection port to the check valve is bent, frictional resistance between the fluid and the wall surface of the flow path can be reduced. Consequently, the fluid inside the first cylinder chamber can be efficiently guided into the second cylinder chamber.

In the above-described cylinder drive manifold device, the respective throttle valves may be variable throttle valves which are disposed at a location on the manifold that is closer to a mounting site for the plurality of switching valves than the respective check valves.

In accordance with such a configuration, the length of the flow paths from the switching valves to the variable throttle valves can be made comparatively short. More specifically, the volume of fluid from the switching valves to the variable throttle valves can be made comparatively small. Therefore, the flow rate (the pressure) of the fluid that is guided from the first connection ports to the third connection ports can be easily adjusted by changing the throttle opening of the variable throttle valves.

In the above-described cylinder drive manifold device, a single supply port, which communicates with each of the introduction ports and to which the fluid from a fluid supply source is supplied, may be formed in the manifold.

In accordance with such a configuration, even in the case that a plurality of the fluid pressure cylinders are driven, the number of pipes provided in order to connect the fluid supply source and the manifold can be reduced.

In the above-described cylinder drive manifold device, a single discharge port, which communicates with each of the lead-out ports and is configured to discharge the fluid to an exterior of the manifold, may be formed in the manifold, and a single silencer configured to reduce discharge noise of the fluid may be disposed in the discharge port.

In accordance with such a configuration, even in the case that a plurality of the fluid pressure cylinders are driven, only one silencer is used.

A cylinder drive apparatus according to the present invention is characterized by comprising the cylinder drive manifold device as described above, and a plurality of the switching valves.

According to the present invention, because the plurality of check valves and the plurality of throttle valves are incorporated in the plurality of holes of the manifold, it is possible to reduce the number of parts, together with making it easy to perform the assembly operation.

The above and other objects, features, and advantages will become more apparent from the following description when taken in conjunction with the accompanying drawings, in which a preferred embodiment of the invention is shown by way of illustrative example.

BRIEF DESCRIPTION OF DRAWINGS

FIG. 1 is a schematic view showing a state in which a cylinder drive apparatus equipped with a cylinder drive manifold device according to an embodiment of the present invention is incorporated in a plurality of fluid pressure cylinders;

FIG. 3 is a cross-sectional view of the fluid pressure cylinder shown in FIG. 2A;

DESCRIPTION OF EMBODIMENTS

Figure 2A:
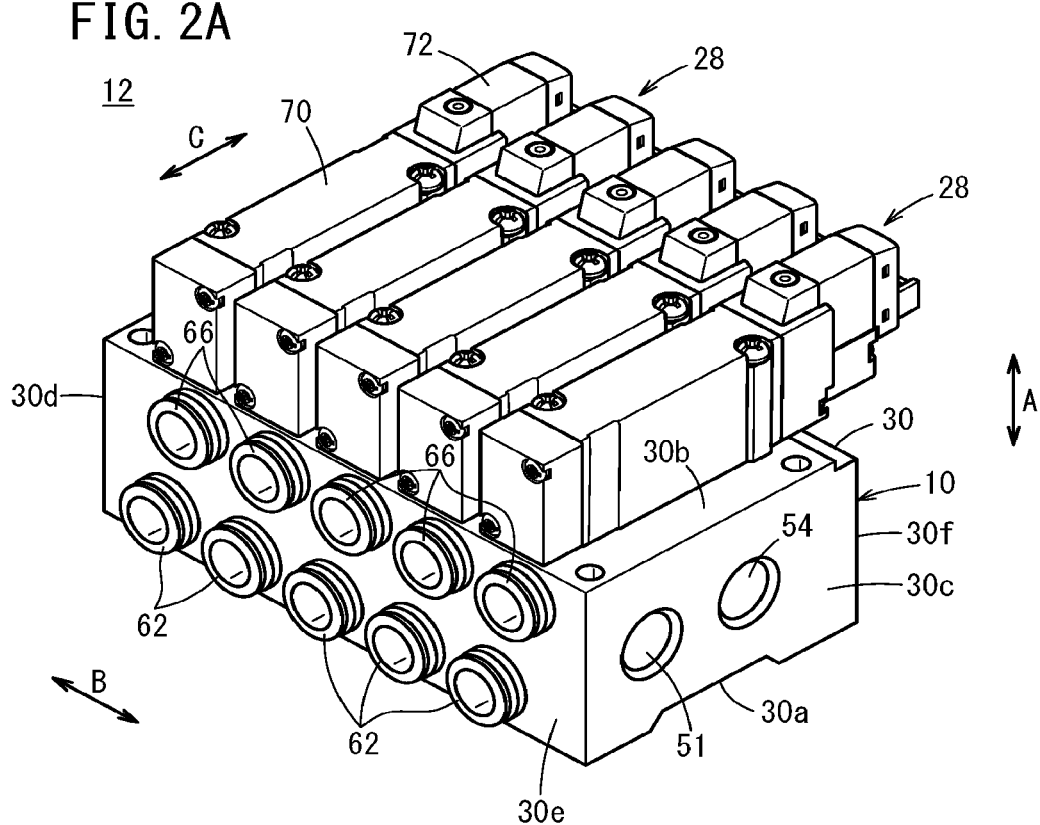
FIG. 2A is a perspective view of the cylinder drive apparatus shown in FIG. 1.
Figure 2B:
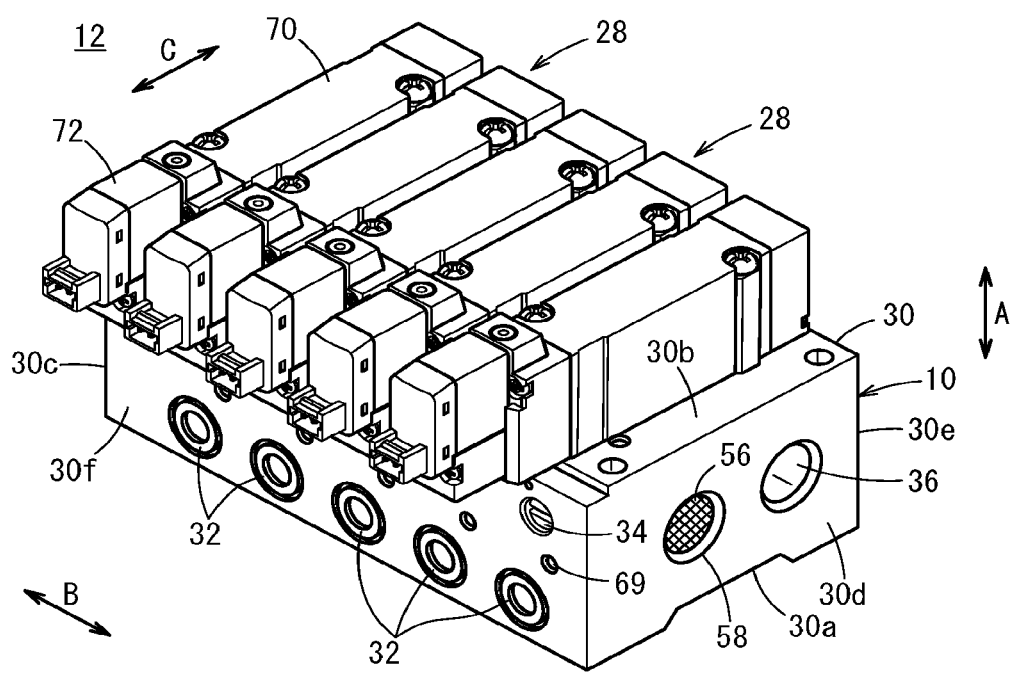
FIG. 2B is a perspective view of the cylinder drive apparatus seen from a different angle from that in FIG. 2A.

Preferred embodiments of a cylinder drive manifold device and a cylinder drive apparatus according to the present invention will be presented and described in detail below with reference to the accompanying drawings.

As shown in FIG. 1, a cylinder drive apparatus 12 according to an embodiment of the present invention serves as an apparatus for driving a plurality of fluid pressure cylinders 14. Each of the fluid pressure cylinders 14 is configured in the form of an air cylinder, for example, and includes a piston 22 that partitions the interior of a cylinder unit 16 into a first cylinder chamber 18 and a second cylinder chamber 20 and that is capable of sliding reciprocally in the interior of the cylinder unit 16 under the action of a fluid pressure. One end of a piston rod 24 is connected to the piston 22 and the other end thereof extends from the cylinder unit 16 to the exterior.

The fluid pressure cylinders 14 perform work such as positioning of non-illustrated workpieces or the like at times that the piston rods 24 are pushed out (expanded), and do not perform work at times that the piston rods 24 are retracted. The first cylinder chambers 18 are driving pressure chambers (head side cylinder chambers) located on an opposite side from the piston rods 24, and the second cylinder chambers 20 are return side pressure chambers (rod side cylinder chambers) located on the side of the piston rods 24.

As shown in FIGS. 1 to 6, the cylinder drive apparatus 12 comprises a fluid supply source 26, a cylinder drive manifold device (hereinafter referred to as a "manifold device 10"), and a plurality of switching valves 28. The fluid supply source 26 supplies a high-pressure fluid, and is configured, for example, in the form of an air compressor (see FIG. 1).

The manifold device 10 is equipped with a single block-shaped manifold 30 to which the plurality of switching valves 28 can be connected, and a plurality of check valves 32 and a plurality of throttle valves 34 that are incorporated in the manifold 30. The switching valves 28, the check valves 32, and the throttle valves 34 are provided respectively in the same number as the number of the fluid pressure cylinders 14. Although in the example shown in FIGS. 2A and 2B, five each of the switching valves 28, the check valves 32, and the throttle valves 34 are provided, the number of these valve members and the fluid pressure cylinders 14 can be arbitrarily changed.

As shown in FIG. 2A to FIG. 6, the manifold 30 is integrally formed in a block shape, for example, from a metal material such as aluminum or the like. However, the constituent material of the manifold 30 is not limited to being a metal material, and any arbitrary material such as a hard resin or the like can be adopted therefor.

The manifold 30 is configured in the shape of a rectangular parallelepiped. More specifically, the manifold 30 includes a first outer surface 30a, a second outer surface 30b, a third outer surface 30c, a fourth outer surface 30d, a fifth outer surface 30e, and a sixth outer surface 30f. The first outer surface 30a and the second outer surface 30b are spaced apart from each other in a height direction (the direction of the arrow A) of the manifold 30. The first outer surface 30a is an installation surface that is placed in contact with a fixing platform (not shown) when the manifold 30 is installed on the fixing platform. The second outer surface 30b is located on a rear side of the first outer surface 30a, and is a mounting surface (mounting site) on which the plurality of switching valves 28 can be mounted. The third outer surface 30c and the fourth outer surface 30d are side surfaces that are separated from each other in a longitudinal direction (the direction of the arrow B) of the manifold 30. The fifth outer surface 30e and the sixth outer surface 30f are side surfaces that are separated from each other in a lateral direction (the direction of the arrow C) of the manifold 30.

As shown in FIGS. 3 to 6, in the manifold 30, a plurality of holes are formed through which the fluid is used for driving the plurality of fluid pressure cylinders 14 flows. More specifically, one supply port 36, one discharge port 38, a plurality of introduction ports 40, a plurality of first connection ports 42, a plurality of second connection ports 44, a plurality of third connection ports 46, and a plurality of lead-out ports 48 are formed in the manifold 30. Moreover, the introduction ports 40, the first connection ports 42, the second connection ports 44, and the third connection ports 46 are provided respectively in the same number as the number of the switching valves 28.

Figure 4:
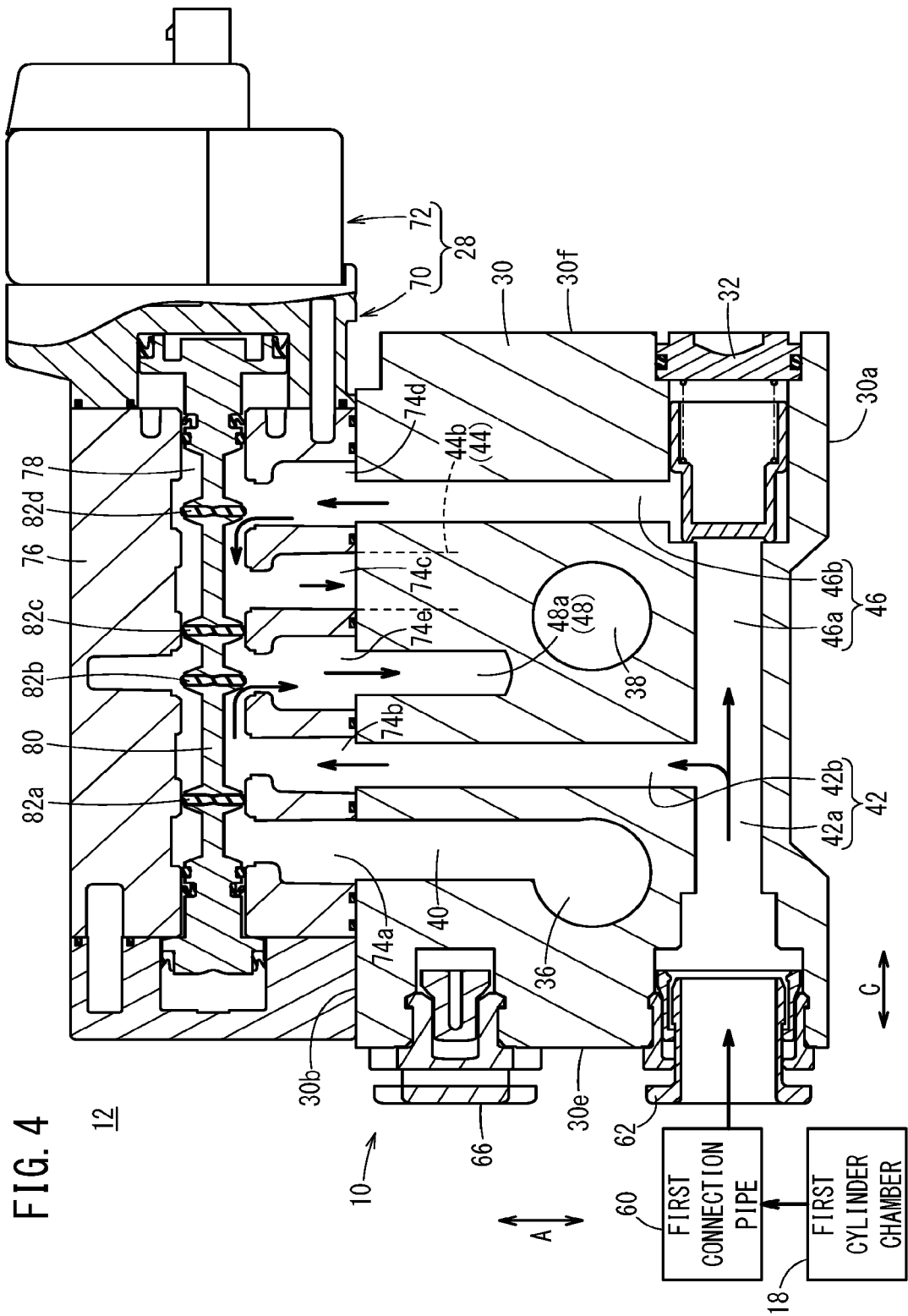
FIG. 4 is a first longitudinal cross-sectional view taken along line IV-IV of FIG. 3 in the cylinder drive apparatus, when performing a return process of the fluid pressure cylinder.

As shown in FIG. 3, the supply port 36 is a hole (passage) which communicates with each of the introduction ports 40, and through which the fluid from the fluid supply source 26 is supplied (see FIG. 4). The supply port 36 is a through hole that extends linearly along the direction of the arrow B, and opens on each of the third outer surface 30c and the fourth outer surface 30d. A blocking member 51 is provided in an end of the supply port 36 on the side of the third outer surface 30c. A connector 52, which is provided in order to connect a supply pipe 50 that is connected to the fluid supply source 26, is attached to an opening of the supply port 36 on the side of the fourth outer surface 30d (see FIG. 1). In this case, because the supply pipe 50 is connected via the connector 52 only to the opening on one side of the supply port 36, in comparison with a case in which the supply pipe 50 is connected via the connectors 52 to openings on both sides of the supply port 36, the number of parts (a portion of the supply pipe 50 and the connector 52) can be reduced. However, in accordance with specifications of the fluid pressure cylinders 14 and the cylinder drive apparatus 12, the supply pipe 50 may be connected via the connectors 52 to the openings on both sides of the supply port 36, so as to increase the amount of fluid that is supplied to the supply port 36.

The discharge port 38 is a hole (passage) that communicates with each of the lead-out ports 48, and discharges the fluid to the exterior of the manifold 30. The discharge port 38 is a through hole that extends linearly along the direction of the arrow B, and opens on each of the third outer surface 30c and the fourth outer surface 30d. A blocking member 54 is provided in an end of the discharge port 38 on the side of the third outer surface 30c. A single silencer 56 is provided in an end of the discharge port 38 on the side of the fourth outer surface 30d in order to reduce the discharge noise (exhaust noise) of the fluid. An opening of the discharge port 38 on the side of the fourth outer surface 30d functions as a discharge outlet 58 (see FIG. 1). The supply port 36 and the discharge port 38 are disposed alongside one another in the direction of the arrow C. However, in accordance with specifications of the fluid pressure cylinder 14 and the cylinder drive apparatus 12, the blocking member 54 may be omitted, and the silencers 56 may be provided in openings on both sides of the discharge port 38. In this case, the fluid inside the discharge port 38 can be discharged more smoothly to the exterior of the manifold 30.

As shown in FIG. 4, the introduction ports 40 are holes (passages) for guiding the fluid to the switching valves 28. The introduction ports 40 extend linearly along the direction of the arrow A from the supply port 36 to the second outer surface 30b.

The first connection ports 42 are holes (passages) for enabling mutual communication between the switching valves 28 and the first cylinder chambers 18 of the fluid pressure cylinders 14. The first connection ports 42 open on the second outer surface 30b and the fifth outer surface 30e. More specifically, the first connection ports 42 include first holes 42a and second holes 42b. The first holes 42a extend linearly along the direction of the arrow C from the fifth outer surface 30e toward the sixth outer surface 30f to a position slightly shifted to the side of the fifth outer surface 30e from the center in the widthwise direction of the manifold 30. The first holes 42a are positioned more closely to the side of the first outer surface 30a than the supply port 36 and the discharge port 38. The second holes 42b extend along the direction of the arrow A to the second outer surface 30b from ends of the first holes 42a on the side of the sixth outer surface 30f. The second holes 42b are positioned between the supply port 36 and the discharge port 38. Connectors 62 (see FIG. 1), to which first connection pipes 60 communicating with the first cylinder chambers 18 of the fluid pressure cylinders 14 can be connected, are provided in openings of the first connection ports 42 in the first holes 42a, with respect to the fifth outer surface 30e.

Figure 5:
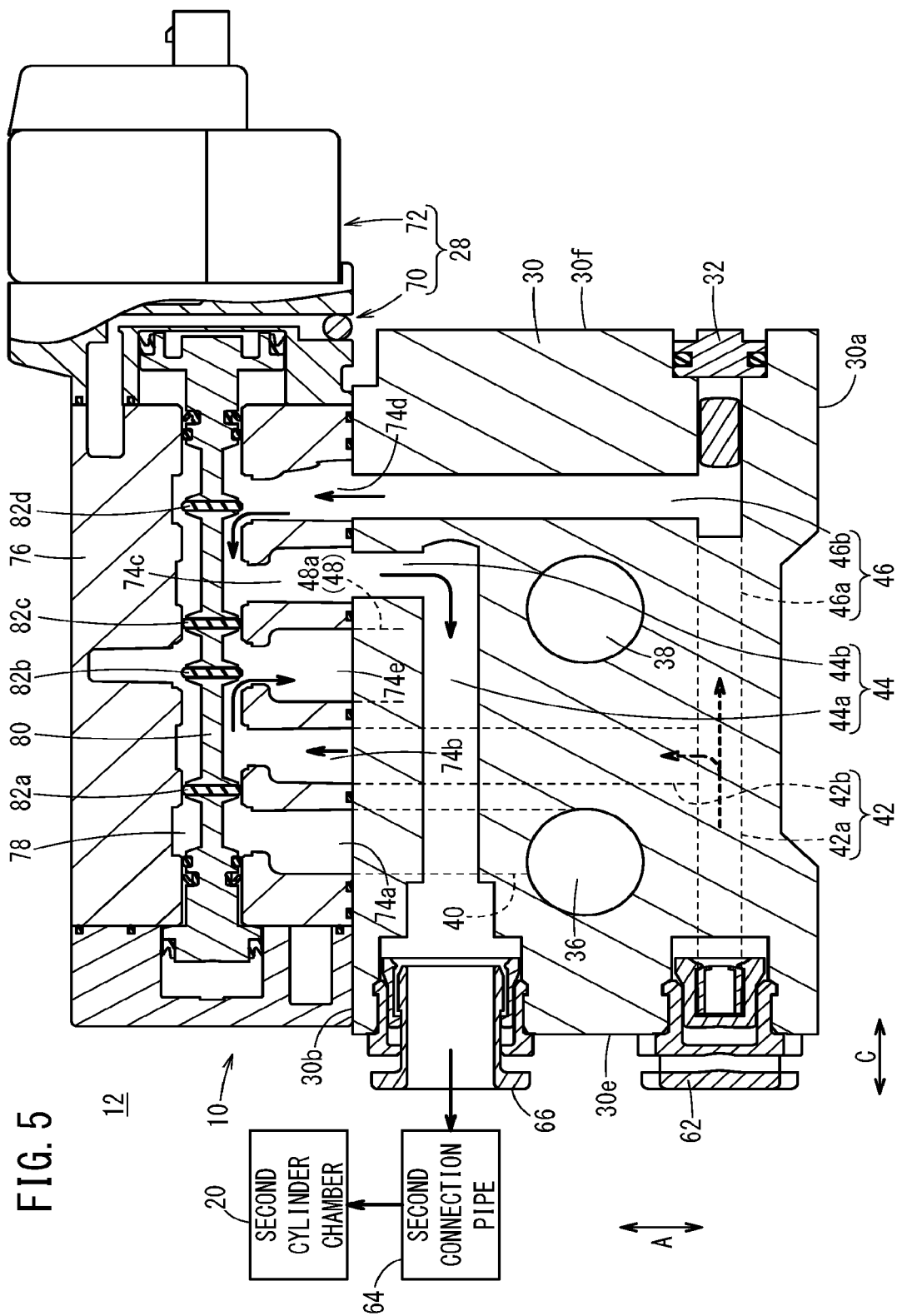
FIG. 5 is a second longitudinal cross-sectional view taken along line V-V of FIG. 3 in the cylinder drive apparatus, when performing the return process of the fluid pressure cylinder.

As shown in FIG. 5, the second connection ports 44 are holes (passages) for enabling mutual communication between the switching valves 28 and the second cylinder chambers 20 of the fluid pressure cylinders 14. The second connection ports 44 include third holes 44a and fourth holes 44b. The third holes 44a extend linearly along the direction of the arrow C from the fifth outer surface 30e toward the sixth outer surface 30f to a position slightly shifted to the side of the sixth outer surface 30f from the center in the widthwise direction of the manifold 30.

The fourth holes 44b extend linearly along the direction of the arrow A to the second outer surface 30b from ends of the third holes 44a on the side of the sixth outer surface 30f. Openings of the second connection ports 44 with respect to the fifth outer surface 30e are positioned more closely to the side of the second outer surface 30b (on the side of the switching valves 28) than the openings of the first connection ports 42 with respect to the fifth outer surface 30e. Connectors 66 (see FIG. 1), to which second connection pipes 64 communicating with the second cylinder chambers 20 of the fluid pressure cylinders 14 can be connected, are provided in openings of the second connection ports 44 in the third holes 44a, with respect to the fifth outer surface 30e.

As shown in FIG. 1, tanks 68 are provided in the second connection pipes 64. The tanks 68 accumulate the fluid that is supplied from the first cylinder chambers 18 toward the second cylinder chambers 20, and are configured in the form of air tanks. By providing the tanks 68, the volumetric capacity of the second cylinder chambers 20 can be substantially increased.

As shown in FIG. 4, the third connection ports 46 are holes (passages) for mutually connecting the switching valves 28 and the first connection ports 42. The third connection ports 46 include fifth holes 46a and sixth holes 46b. The fifth holes 46a extend linearly along the direction of the arrow C to the second outer surface 30b from ends of the first holes 42a on the side of the sixth outer surface 30f. The sixth holes 46b extend linearly along the direction of the arrow A from the fifth holes 46a to the second outer surface 30b.

In the fifth holes 46a of the third connection ports 46, the check valves 32 are provided which allow flow of the fluid in a direction from the first holes 42a of the first connection ports 42 toward the switching valves 28, and which prevent flow of the fluid in a direction from the switching valves 28 toward the first connection ports 42. In the first holes 42a of the first connection ports 42 and the fifth holes 46a of the third connection ports 46, fluid flow paths to the check valves 32 from openings in the first holes 42a with respect to the fifth outer surface 30e are formed so as to extend linearly along the direction of the arrow C.

Figure 6:
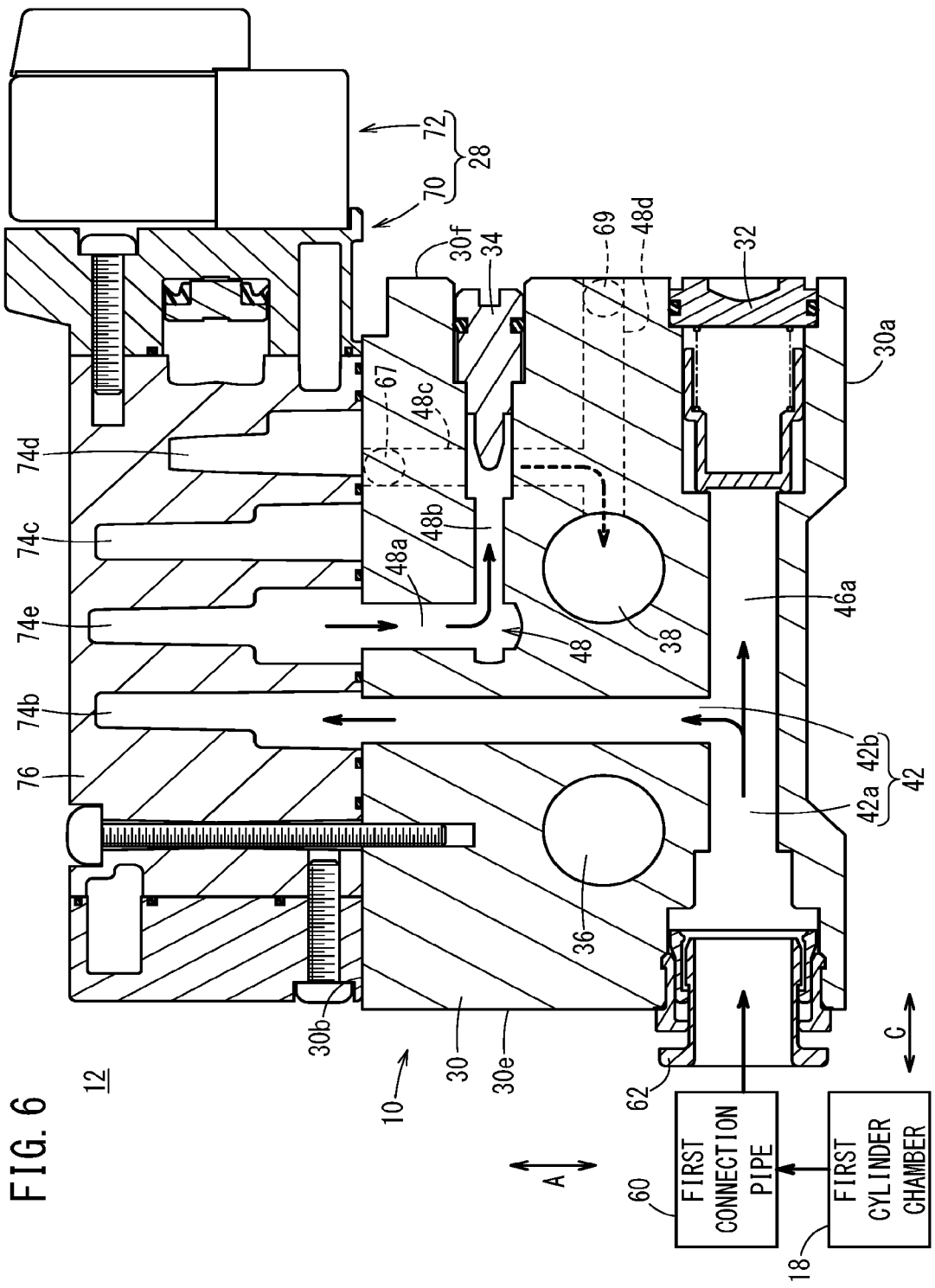
FIG. 6 is a third longitudinal cross-sectional view taken along line VI-VI of FIG. 3 in the cylinder drive apparatus, when performing the return process of the fluid pressure cylinder.

As shown in FIG. 6, the lead-out ports 48 are holes (passages) in which the fluid from the respective switching valves 28 is guided. The lead-out ports 48 extend from the second outer surface 30b to the discharge port 38. More specifically, the lead-out ports 48 include first lead-out holes 48a, second lead-out holes 48b, third lead-out holes 48c, and fourth lead-out holes 48d. The first lead-out holes 48a extend linearly along the direction of the arrow A from the second outer surface 30b toward the first outer surface 30a. The second lead-out holes 48b extend linearly along the direction of the arrow C from the first lead-out holes 48a to the sixth outer surface 30f. The second lead-out holes 48b are positioned more closely to the second outer surface 30b than the fifth holes 46a of the third connection ports 46.

The third lead-out holes 48c extend linearly along the direction of the arrow A from the second outer surface 30b toward the first outer surface 30a so as to pass through the second lead-out holes 48b. Blocking members 67 which are made, for example, from steel balls or the like are disposed in an airtight manner within the third lead-out holes 48c, more on the side of the second outer surface 30b than the second lead-out holes 48b. The fourth lead-out holes 48d extend linearly along the direction of the arrow C from ends of the third lead-out holes 48c on the side of the first outer surface 30a. The fourth lead-out holes 48d open on the sixth outer surface 30f and on a wall surface that constitutes the discharge port 38. Blocking members 69 which are made, for example, from steel balls or the like are disposed in an airtight manner within the fourth lead-out holes 48d, more on the side of the sixth outer surface 30f than the third lead-out holes 48c.

The throttle valves 34 are disposed in the second lead-out holes 48b of the lead-out ports 48. The throttle valves 34 are variable throttle valves which are disposed (on the side of the second outer surface 30b) at a location on the manifold 30 that is closer to the mounting site for the plurality of switching valves 28 than the check valves 32. More specifically, the throttle valves 34 are configured to be capable of changing the flow passage cross-sectional areas of the lead-out ports 48. By rotating the throttle valves 34 with a tool such as a flat-blade screwdriver, and thereby causing the throttle valves 34 to be advanced or retracted, a user can change the flow passage cross-sectional areas of the lead-out ports 48.

As shown in FIGS. 4 to 6, the respective openings of the introduction ports 40, the first connection ports 42, the lead-out ports 48, the second connection ports 44, and the third connection ports 46 are positioned in this order along the direction of the arrow C, on the second outer surface 30b of the manifold 30 on which the plurality of switching valves 28 are capable of being mounted.

As shown in FIGS. 1, 4, and 5, the plurality of switching valves 28 alternately supply the fluid to the first cylinder chambers 18 and the second cylinder chambers 20 that are partitioned by the pistons 22 of the respective fluid pressure cylinders 14. Each of the switching valves 28 is a so-called five-port pilot-type solenoid valve, and is equipped with a valve main body 70, and a pilot valve mechanism 72 disposed on the valve main body 70. The valve main body 70 includes a body 76 in which first to fifth ports 74a to 74e are formed, and a spool 80 that is displaceably disposed within a valve chamber 78 of the body 76.

In the body 76, the first port 74a, the second port 74b, the fifth port 74e, the third port 74c, and the fourth port 74d are positioned in this order along the direction of the arrow C. The first port 74a communicates with the introduction port 40. The second port 74b communicates with the second hole 42b of the first connection port 42. The third port 74c communicates with the fourth hole 44b of the second connection port 44. The fourth port 74d communicates with the sixth hole 46b of the third connection port 46. The fifth port 74e communicates with the first lead-out hole 48a of the lead-out port 48.

The spool 80 includes first to fourth large diameter portions 82a to 82d. The first large diameter portion 82a, by coming into contact with a wall surface constituting the valve chamber 78, is capable of blocking communication between the first port 74a and the second port 74b. The second large diameter portion 82b, by coming into contact with the wall surface constituting the valve chamber 78, is capable of blocking communication between the second port 74b and the fifth port 74e. The third large diameter portion 82c, by coming into contact with the wall surface constituting the valve chamber 78, is capable of blocking communication between the fifth port 74e and the third port 74c. The fourth large diameter portion 82d, by coming into contact with the wall surface constituting the valve chamber 78, is capable of blocking communication between the third port 74c and the fourth port 74d.

Stated otherwise, by causing the spool 80 to be displaced, the switching valve 28 can switch between a state of communication and a state of blockage, respectively, between the introduction port 40 and the first connection port 42, between the first connection port 42 and the lead-out port 48, between the lead-out port 48 and the second connection port 44, and between the second connection port 44 and the third connection port 46.

Figure 7:
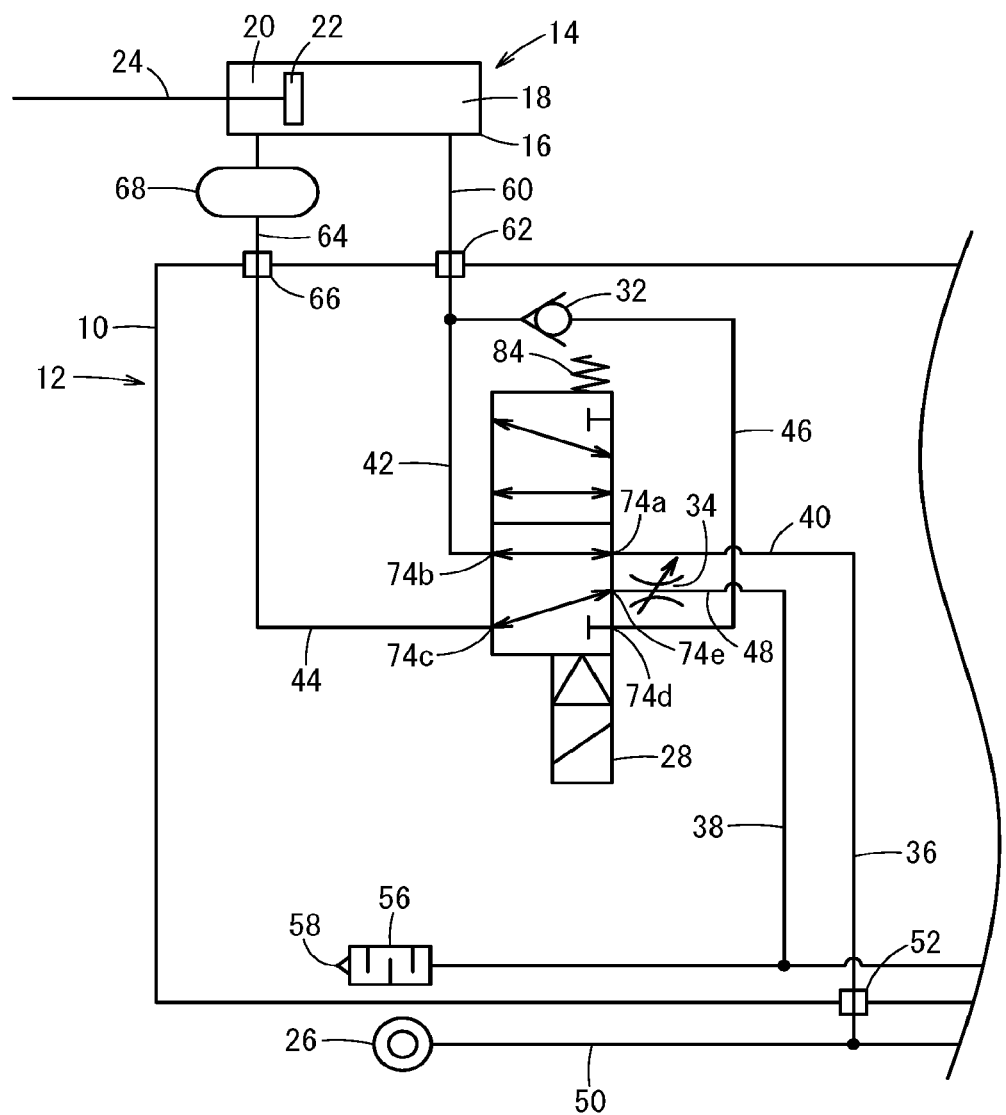
FIG. 7 is a schematic view with partial omission showing a state in which a switching valve of FIG. 1 is switched from a second position to a first position.
Figure 8:
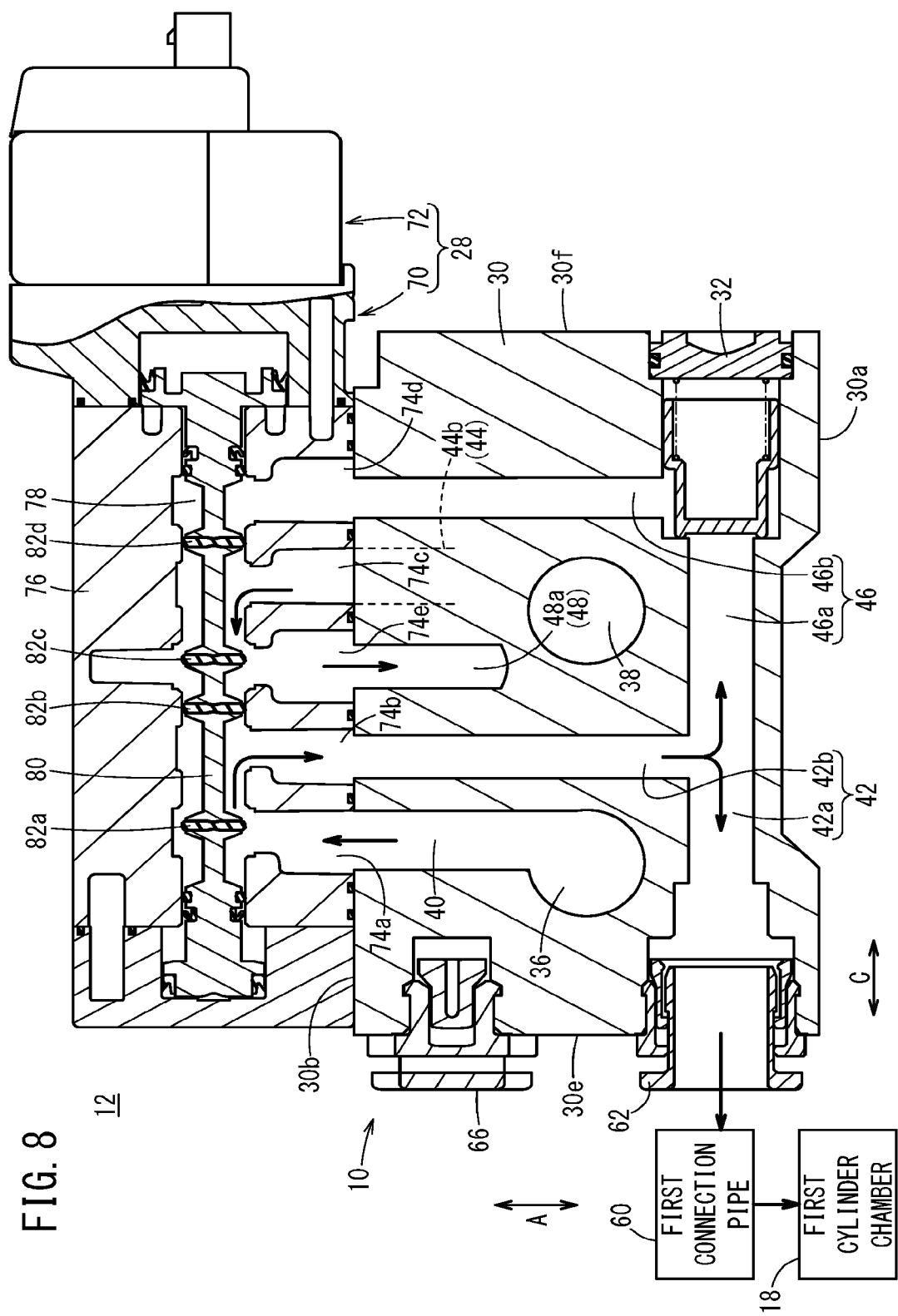
FIG. 8 is a first longitudinal cross-sectional view of the cylinder drive apparatus when a fluid pressure cylinder driving process is performed.
Figure 9:
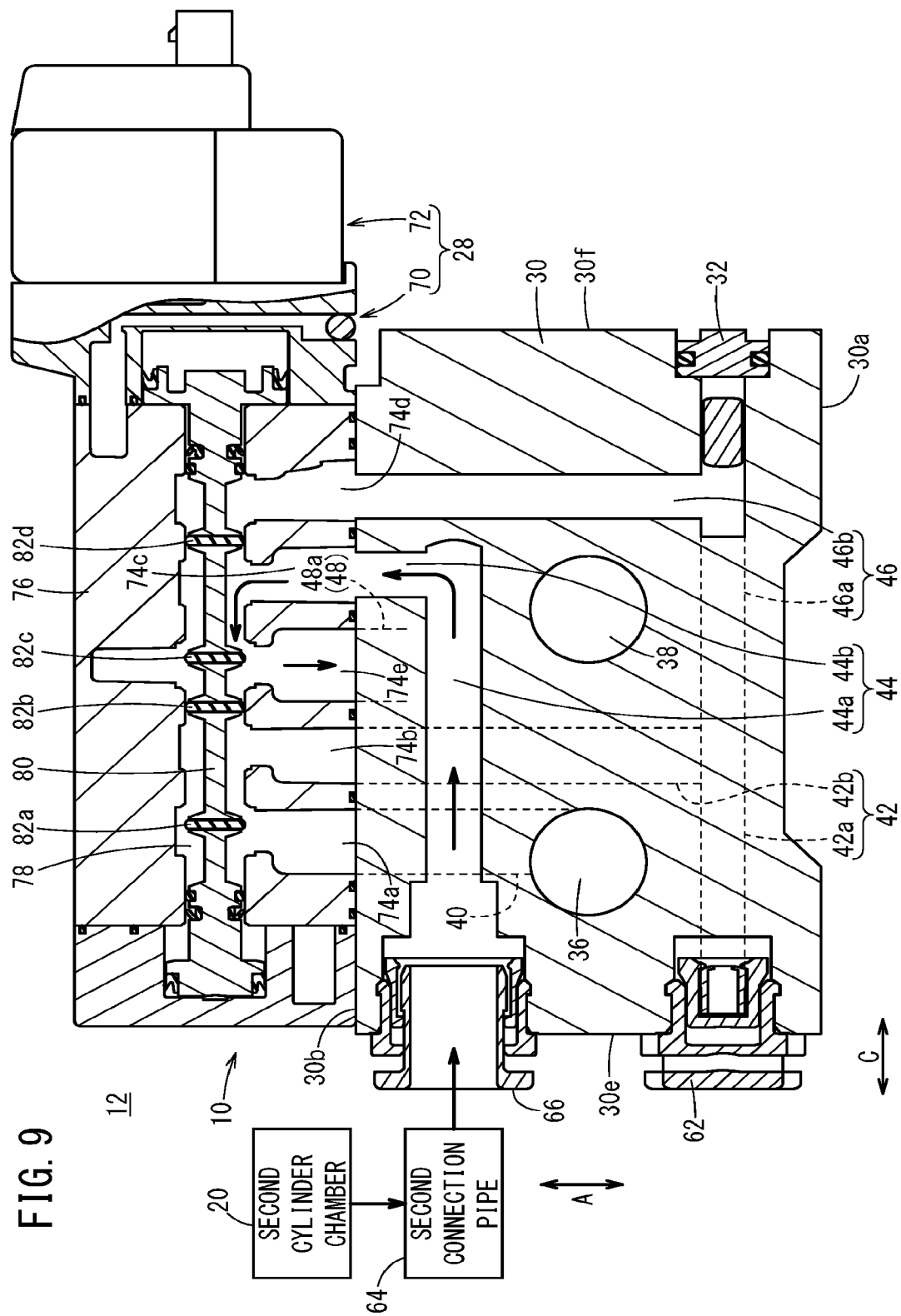
FIG. 9 is a second longitudinal cross-sectional view of the cylinder drive apparatus when the fluid pressure cylinder driving process is performed.

More specifically, as shown in FIGS. 7 to 9, at a first position of the switching valve 28, the introduction port 40 and the first connection port 42 are in mutual communication with each other, and the lead-out port 48 and the second connection port 44 are in mutual communication with each other. Further, in the first position, communication between the first connection port 42 and the lead-out port 48 is blocked, and communication between the second connection port 44 and the third connection port 46 is blocked.

As shown in FIGS. 1, 4, and 5, at a second position of the switching valve 28, the first connection port 42 and the lead-out port 48 are in mutual communication with each other, and the second connection port 44 and the third connection port 46 are in mutual communication with each other. Further, in the second position, communication between the introduction port 40 and the first connection port 42 is blocked, and communication between the lead-out port 48 and the second connection port 44 is blocked.

At a time of non-energization, the switching valves 28 are maintained in the second position by a biasing force of the springs 84 (see FIG. 1), and when energized, are switched from the second position to the first position under the action of the pilot valve mechanisms 72. Moreover, energization of the switching valves 28 is performed by outputting energization commands to the switching valves 28 from a non-illustrated PLC (Programmable Logic Controller) which is a higher-order device. Non-energization of the switching valves 28 is performed by outputting non-energization commands from the PLC to the switching valves 28.

The cylinder drive apparatus 12 according to the present embodiment is configured basically in the manner described above. Next, operations (a method of usage) thereof will be described. In an initial state, as shown in FIG. 1, the pistons 22 of the fluid pressure cylinders 14 are located at a stroke end position on an opposite side from the piston rods 24, and the switching valves 28 are placed in the second position.

In the cylinder drive apparatus 12, in the case that a driving process is performed to cause the piston rods 24 to be extended, the switching valves 28 are switched from the second position to the first position as shown in FIG. 7. Upon doing so, as shown in FIGS. 3 and 8, the high-pressure fluid (compressed air), which is guided from the fluid supply source 26 to the supply port 36 via the supply pipe 50, branches into the plurality of introduction ports 40. Then, as shown In FIG. 8, the fluid that has branched into the respective introduction ports 40 flows into the first cylinder chambers 18 of the respective fluid pressure cylinders 14 via the first ports 74a, the second ports 74b, the first connection ports 42, and the first connection pipes 60. Consequently, the pistons 22 are displaced to the side of the piston rods 24, and the piston rods 24 are extended. At this time, since communication between the second connection ports 44 and the third connection ports 46 is blocked by the switching valves 28, the fluid from the fluid supply source 26 is efficiently supplied into the first cylinder chambers 18.

Figure 10:
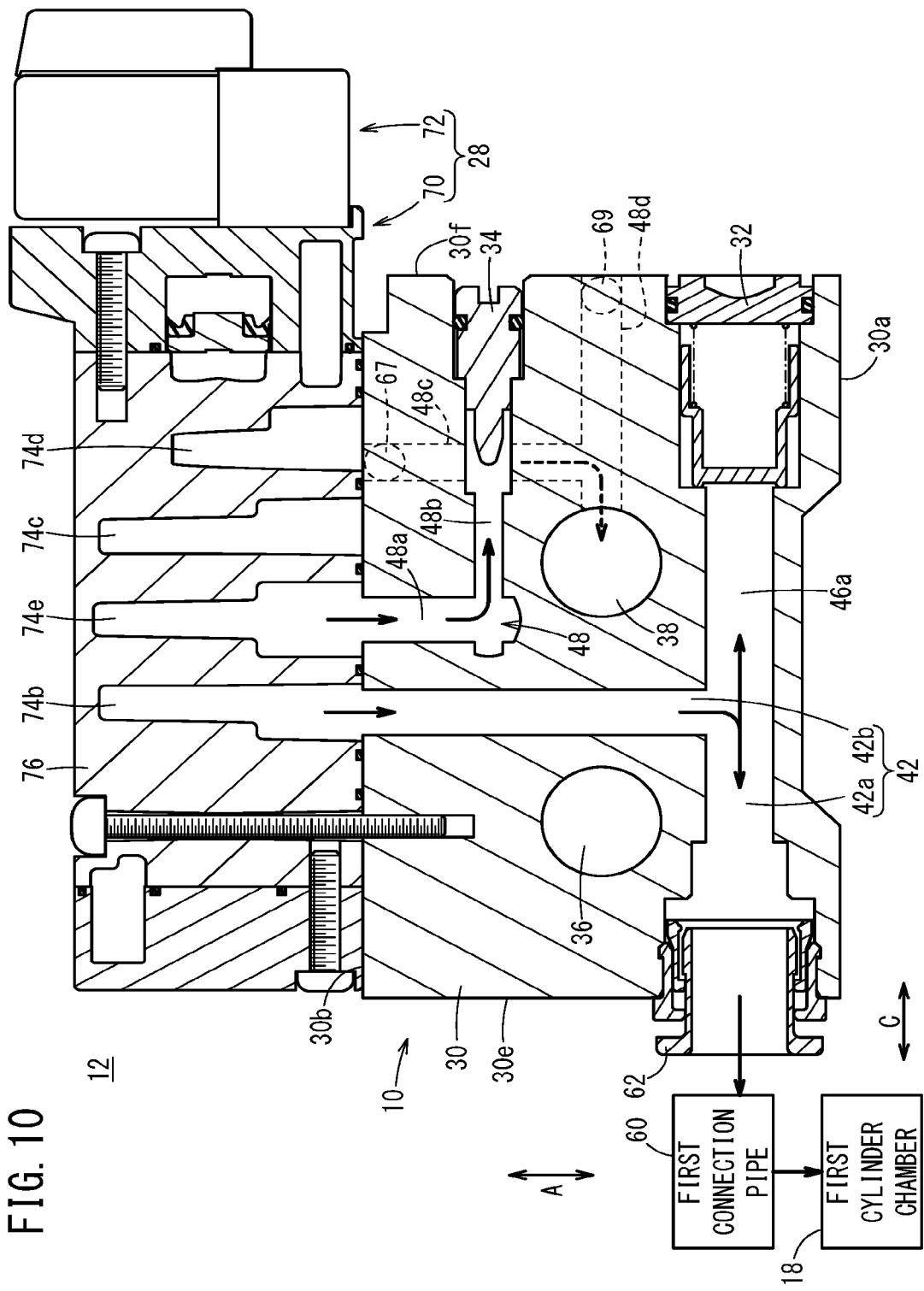
FIG. 10 is a third longitudinal cross-sectional view of the cylinder drive apparatus when the fluid pressure cylinder driving process is performed.

Further, as shown in FIGS. 9 and 10, the fluid in the second cylinder chambers 20 of the respective fluid pressure cylinders 14 flows into the discharge port 38 after being guided to the lead-out ports 48 via the second connection pipes 64 (and the tanks 68), the second connection ports 44, the third ports 74c, and the fifth ports 74e (refer to FIGS. 7, 9, and 10), and having passed through the throttle valves 34. Then, the fluid that has flowed into the discharge port 38 from the plurality of lead-out ports 48 passes through the silencer 56, and is discharged from the discharge outlet 58 into the atmosphere (see FIG. 3).

Next, in the case that a return process is performed to retract the piston rods 24, the switching valves 28 are switched from the first position to the second position as shown in FIG. 1. Upon doing so, the supply of fluid from the fluid supply source 26 into the first cylinder chambers 18 is stopped. Then, as shown in FIGS. 4 and 6, the fluid in the first cylinder chambers 18 is guided to the first connection pipes 60 and the first holes 42a of the first connection ports 42, and branches into the second holes 42b and the third connection ports 46. The fluid that has flowed into the second holes 42b flows into the discharge port 38 after being guided to the lead-out ports 48 via the second ports 74b and the fifth ports 74e, and having passed through the throttle valves 34.

As shown in FIGS. 4 and 5, the fluid that has flowed into the third connection ports 46 flows into the second cylinder chambers 20 via the fourth ports 74d, the third ports 74c, the second connection ports 44, and the second connection pipes 64. Moreover, by changing the throttle openings (flow passage cross-sectional area) of the throttle valves 34, the ratio between the flow rate of the fluid that is guided from the first holes 42a to the third connection ports 46, and the flow rate of the fluid that is guided from the first holes 42a to the second holes 42b is adjusted. When the fluid flows into the second cylinder chambers 20, the pistons 22 are displaced to the side opposite from the piston rods 24, and the piston rods 24 are retracted.

In the return process, the pistons 22 are displaced using the fluid that is discharged from the first cylinder chambers 18. Therefore, there is no need to supply fluid from the fluid supply source 26 into the second cylinder chambers 20, and the power consumption and the air consumption amount of the fluid supply source 26 can be suppressed, whereby it is possible to achieve a saving of energy of the cylinder drive apparatus 12.

Next, advantages and effects of the present embodiment will be described below.

The manifold device 10 that constitutes the cylinder drive apparatus 12 serves as a device for driving the plurality of fluid pressure cylinders 14. The manifold device 10 is equipped with the block-shaped manifold 30 in which a plurality of holes (the supply port 36, the discharge port 38, the introduction ports 40, the first connection ports 42, the second connection ports 44, the third connection ports 46, and the lead-out ports 48) are formed through which the fluid used to drive the plurality of fluid pressure cylinders 14 flows. The manifold 30 is configured to enable the plurality of switching valves 28 to be mounted thereon, the switching valves being configured to alternately supply the fluid to the first cylinder chambers 18 and the second cylinder chambers 20 which are partitioned by the pistons 22 of the respective fluid pressure cylinders 14. The plurality of check valves 32 and the plurality of throttle valves 34 are incorporated in the plurality of holes of the manifold 30.

In this manner, in the manifold device 10, since the plurality of check valves 32 are incorporated in the plurality of holes of the manifold 30, piping for the purpose of connecting the switching valves 28 and the check valves 32 to each other is rendered unnecessary. Further, since the plurality of throttle valves 34 are incorporated in the plurality of holes of the manifold 30, piping for the purpose of connecting the switching valves 28 and the throttle valves 34 to each other is rendered unnecessary. Accordingly, it is possible to reduce the number of parts of the cylinder drive manifold device 10, together with making it easy to perform the assembly operation.

The plurality of holes of the manifold 30 include the plurality of introduction ports 40 through which the fluid is introduced into the respective switching valves 28, the plurality of lead-out ports 48 through which the fluid is guided from the respective switching valves 28, the plurality of first connection ports 42 which enable mutual communication between the respective switching valves 28 and the first cylinder chambers 18 of the respective fluid pressure cylinders 14, the plurality of second connection ports 44 which enable mutual communication between the respective switching valves 28 and the second cylinder chambers 20 of the respective fluid pressure cylinders 14, and the plurality of third connection ports 46 that connect the first connection ports 42 and the switching valves 28 to each other.

In each of the third connection ports 46, the check valve 32 is provided which allows flow of the fluid in a direction from the first connection port 42 toward the switching valve 28, and which prevents flow of the fluid in a direction from the switching valve 28 toward the first connection port 42. The throttle valves 34 are provided in the respective lead-out ports 48.

Each of the switching valves 28 is capable of switching between a state of communication and a state of blockage, respectively, between the introduction port 40 and the first connection port 42, between the first connection port 42 and the lead-out port 48, between the lead-out port 48 and the second connection port 44, and between the second connection port 44 and the third connection port 46.

In the first position of the switching valves 28, the introduction port 40 and the first connection port 42 communicate with each other, and the lead-out port 48 and the second connection port 44 communicate with each other, while communication between the first connection port 42 and the lead-out port 48 is blocked, and communication between the second connection port 44 and the third connection port 46 is blocked (refer to FIG. 8).

In the second position of the switching valves 28, the first connection port 42 and the lead-out port 48 communicate with each other, and the second connection port 44 and the third connection port 46 communicate with each other, while communication between the introduction port 40 and the first connection port 42 is blocked, and communication between the lead-out port 48 and the second connection port 44 is blocked (refer to FIG. 4).

In this case, in the second position of the switching valves 28, the fluid inside the first cylinder chamber 18 of the fluid pressure cylinder 14 is supplied to the second cylinder chamber 20 and simultaneously discharged to the lead-out port 48 via the first connection port 42, the third connection port 46, and the second connection port 44 (see FIGS. 4 to 6). Consequently, the fluid pressure in the second cylinder chamber 20 increases and the fluid pressure in the first cylinder chamber 18 rapidly decreases, and therefore, it is possible to reduce the amount of fluid that is consumed in order to drive the fluid pressure cylinder 14. Therefore, it is possible to achieve a saving of energy when the plurality of fluid pressure cylinders 14 are driven.

In each of the first connection ports 42 and each of the third connection ports 46, a fluid flow path is formed so as to extend linearly to the check valve 32 from an opening of the first connection port 42 in which the connector 62 can be mounted to which a pipe communicating with the first cylinder chamber 18 can be connected.

In accordance with this feature, in comparison with a case in which the fluid flow path from the opening of the first connection port 42 to the check valve 32 is bent, frictional resistance between the fluid and the wall surface of the flow path can be reduced. Thus, the fluid inside the first cylinder chamber 18 can be efficiently guided into the second cylinder chamber 20.

The respective throttle valves 34 are variable throttle valves which are disposed at a location on the manifold 30 that is closer to a mounting site for the plurality of switching valves 28 than the respective check valves 32. Therefore, the length of the flow paths from the switching valves 28 to the throttle valves 34 can be made comparatively short. More specifically, the volume of fluid from the switching valves 28 to the throttle valves 34 can be made comparatively small. Therefore, the flow rate (the pressure) of the fluid that is guided from the first connection ports 42 to the third connection ports 46 can be easily adjusted by changing the throttle opening of the throttle valves 34.

A single supply port 36, which communicates with each of the introduction ports 40 and to which the fluid from the fluid supply source 26 is supplied, is formed in the manifold 30. In accordance with this feature, even in the case that a plurality of the fluid pressure cylinders 14 are driven, the number of pipes provided in order to connect the fluid supply source 26 and the manifold 30 can be reduced.

A single discharge port 38, which communicates with each of the lead-out ports 48 and is configured to discharge the fluid to the exterior of the manifold 30, is formed in the manifold 30. In addition, a single silencer 56 configured to reduce discharge noise of the fluid is disposed in the discharge port 38. Therefore, even in the case that a plurality of the fluid pressure cylinders 14 are driven, only one silencer 56 is used.

The cylinder drive manifold device and the cylinder drive apparatus according to the present invention are not limited to those in the embodiments described above. It is a matter of course that various modified or additional structures could be adopted therein without deviating from the essence and gist of the invention.

The invention claimed is:

1. A cylinder drive manifold device configured to drive a plurality of fluid pressure cylinders, the cylinder drive manifold device comprising:
   a block-shaped manifold in which a plurality of holes are formed through which a fluid used to drive the plurality of fluid pressure cylinders flows,
   wherein the manifold is configured to enable a plurality of switching valves to be mounted thereon, the switching valves being configured to alternately supply the fluid to a first cylinder chamber and a second cylinder chamber partitioned by a piston of each of the fluid pressure cylinders, and
   a plurality of check valves and a plurality of throttle valves are incorporated in the plurality of holes of the manifold,
   wherein the plurality of holes of the manifold include:
      a plurality of introduction ports configured to introduce the fluid into the respective switching valves;
      a plurality of lead-out ports through which the fluid is guided from the respective switching valves;
      a plurality of first connection ports configured to enable mutual communication between the respective switching valves and the first cylinder chambers of the respective fluid pressure cylinders;
      a plurality of second connection ports configured to enable mutual communication between the respective switching valves and the second cylinder chambers of the respective fluid pressure cylinders; and
      a plurality of third connection ports configured to connect the first connection ports and the switching valves to each other,
   wherein, in each of the third connection ports, the check valve is provided which allows flow of the fluid in a direction from the first connection port toward the switching valve, and which prevents flow of the fluid in a direction from the switching valve toward the first connection port,
   the throttle valves are provided in the respective lead-out ports,
   each of the switching valves is configured to switch between a state of communication and a state of blockage, respectively, between the introduction port and the first connection port, between the first connection port and the lead-out port, between the lead-out port and the second connection port, and between the second connection port and the third connection port, in a first position of the switching valves, the introduction port and the first connection port communicate with each other, and the lead-out port and the second connection port communicate with each other, while communication between the first connection port and the lead-out port is blocked, and communication between the second connection port and the third connection port is blocked, and in a second position of the switching valves, the first connection port and the lead-out port communicate with each other, and the second connection port and the third connection port communicate with each other, while communication between the introduction port and the first connection port is blocked, and communication between the lead-out port and the second connection port is blocked.

2. The cylinder drive manifold device according to claim 1, wherein, in each of the first connection ports and each of the third connection ports, a fluid flow path is formed so as to extend linearly to the check valve from an opening of the first connection port in which a connector, to which a pipe communicating with the first cylinder chamber is connectable, is configured to be mounted.

3. The cylinder drive manifold device according to claim 1, wherein the respective throttle valves are variable throttle valves which are disposed at a location on the manifold that is closer to a mounting site for the plurality of switching valves than the respective check valves.

4. The cylinder drive manifold device according to claim 1, wherein a single supply port, which communicates with each of the introduction ports and to which the fluid from a fluid supply source is supplied, is formed in the manifold.

5. The cylinder drive manifold device according to claim 1, wherein
a single discharge port, which communicates with each of the lead-out ports and is configured to discharge the fluid to an exterior of the manifold, is formed in the manifold, and
a single silencer configured to reduce discharge noise of the fluid is disposed in the discharge port.

6. A cylinder drive apparatus including a cylinder drive manifold device configured to drive a plurality of fluid pressure cylinders, the cylinder drive manifold device comprising:
a block-shaped manifold in which a plurality of holes are formed through which a fluid used to drive the plurality of fluid pressure cylinders flows,
a plurality of switching valves,
wherein the manifold is configured to enable the plurality of switching valves to be mounted thereon, the switching valves being configured to alternately supply the fluid to a first cylinder chamber and a second cylinder chamber partitioned by a piston of each of the fluid pressure cylinders, and
a plurality of check valves and a plurality of throttle valves are incorporated in the plurality of holes of the manifold,
wherein the plurality of holes of the manifold include:
a plurality of introduction ports configured to introduce the fluid into the respective switching valves;
a plurality of lead-out ports through which the fluid is guided from the respective switching valves;
a plurality of first connection ports configured to enable mutual communication between the respective switching valves and the first cylinder chambers of the respective fluid pressure cylinders;
a plurality of second connection ports configured to enable mutual communication between the respective switching valves and the second cylinder chambers of the respective fluid pressure cylinders; and
a plurality of third connection ports configured to connect the first connection ports and the switching valves to each other,
wherein, in each of the third connection ports, the check valve is provided which allows flow of the fluid in a direction from the first connection port toward the switching valve, and which prevents flow of the fluid in a direction from the switching valve toward the first connection port,
the throttle valves are provided in the respective lead-out ports,
each of the switching valves is configured to switch between a state of communication and a state of blockage, respectively, between the introduction port and the first connection port, between the first connection port and the lead-out port, between the lead-out port and the second connection port, and between the second connection port and the third connection port,
in a first position of the switching valves, the introduction port and the first connection port communicate with each other, and the lead-out port and the second connection port communicate with each other, while communication between the first connection port and the lead-out port is blocked, and communication between the second connection port and the third connection port is blocked, and
in a second position of the switching valves, the first connection port and the lead-out port communicate with each other, and the second connection port and the third connection port communicate with each other, while communication between the introduction port and the first connection port is blocked, and communication between the lead-out port and the second connection port is blocked.

* * * * *